United States Patent
Chen et al.

(10) Patent No.: US 7,005,965 B2
(45) Date of Patent: Feb. 28, 2006

(54) RADIO FREQUENCY IDENTIFICATION DEVICE

(75) Inventors: Mao-Song Chen, Hsinchu (TW); Chin-Te Ho, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 299 days.

(21) Appl. No.: 10/366,660

(22) Filed: Feb. 14, 2003

(65) Prior Publication Data

US 2004/0160310 A1 Aug. 19, 2004

(51) Int. Cl.
*H04Q 5/22* (2006.01)

(52) U.S. Cl. .................. 340/10.2; 340/10.3; 340/572.1

(58) Field of Classification Search ............... 340/10.2, 340/10.3, 10.32, 572.1; 370/314, 442; 235/383
See application file for complete search history.

(56) References Cited

U.S. PATENT DOCUMENTS 5,307,349 A * 4/1994 Shloss et al. ............... 370/442
5,365,551 A * 11/1994 Snodgrass et al. .......... 375/141
5,539,394 A * 7/1996 Cato et al. ................ 340/10.32
5,686,902 A * 11/1997 Reis et al. .................. 340/10.2
5,883,582 A * 3/1999 Bowers et al. ............. 340/10.2
5,929,779 A * 7/1999 MacLellan et al. ........ 340/10.2
6,641,036 B1 * 11/2003 Kalinowski ................ 235/383
6,661,336 B1 * 12/2003 Atkins et al. .............. 340/10.2

FOREIGN PATENT DOCUMENTS

WO      WO 01/01326 A2 *  1/2001

* cited by examiner

*Primary Examiner*—Edwin C. Holloway, III
(74) *Attorney, Agent, or Firm*—Birch, Stewart, Kolasch & Birch, LLP

(57) ABSTRACT

The present invention provides a radio frequency identification (RFID) device including a detector and several identification tags. The detector transmits time slot cycle signals, and each of the cycle signals is divided into several slots. The identification tags receive the time slot cycle signal, and each of the tags respectively contains a random generator to generate a random number. Individual identification tag responds to the detector in an assigned time slot corresponding to a random number generated by the random generator in each single time slot cycle.

11 Claims, 3 Drawing Sheets

RADIO FREQUENCY IDENTIFICATION DEVICE

BACKGROUND OF THE INVENTION

1. Field of the Invention

This invention generally relates to the field of a radio frequency identification (RFID) device. More particularly, the present invention relates to an RFID device to identify tags with the same identification code.

2. Description of the Prior Art

The use of RFID tags or cards to identify a person or an object is well known. In general, such tags, when excited, produce a magnetic field, or in some cases an electric field, of a first frequency, which is modulated with an identifying code. The tag may be either an active tag, i.e., a tag, which has a self contained power supply or, as is more usually the case, may be a passive tag that requires external excitation when it is to be read or disposed within the detection volume of a reader, for example, a door way or portal. In general, for portal type devices, passive type devices are utilized wherein a transmitting antenna for transmitting an exciting frequency signal for the tag is positioned at the portal and generally adjacent an antenna for receiving the modulated magnetic field, or electromagnetic field, produced by the excited tag in order to identify the tag, and consequently the user or object attached thereto.

In addition, the RFID tags can include different identification codes to be used in distinguishing different objects. For example, using different identification codes in the tags for staffs and visitors makes users be identified by reading the identification codes from a reader while the users pass through the door way.

As mentioned above, the reader identifies either a single tag or tags with different identification codes passing through the detection range. However, the reader cannot simultaneously identify the quantity of tags with the same identification code in the detection range. For example, the goods in a warehouse have tags for identification, and different kinds of goods have tags with different identification codes. A storekeeper can only get the quantity of the categories by using the reader, but cannot get the quantity of each kind of goods.

Hence, there is a need for an improved RFID system that can identify the amount of tags with the same identification, as well as detect in time variance in the quantity of tags within the detection range.

SUMMARY OF THE INVENTION

According to the shortcomings mentioned in the background, the present invention provides a radio frequency identification (RFID) device for identifying the tags with the same identification code to improve the foregoing drawback.

Accordingly, one of the objects of the present invention is to provide an RFID device for identifying the tags with the same identification code.

Another object is to detect the quantity changes of the tags in the detection range immediately.

Another object is to identify the quantity of the tags with the same identification code.

According to the objects mentioned above, the present invention provides an RFID device including a detector and several identification tags. The detector transmits a time slot cycle signal, and each of the time slot cycle signal is divided into several time slots. The identification tags receive the time slot cycle signal, and each of the tags respectively contains a random generator to generate a random number. Individual identification tag responds to the detector in an assigned time slot corresponding to a random number generated by the random generator in each single time slot cycle.

The present invention further discloses a method to be used in the RFID device for identifying the tags with the same identification code, including: transmitting a continuous time slot cycle signal, wherein each of the time slot cycles is divided into several slots; detecting all responses from the tags in the detection range, wherein the responses are in different time slots; and counting all responses from the tags and comparing them with the threshold to confirm the existence of the tags.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description given hereinbelow and the accompanying drawings, which are given by way of illustration only, and thus are not limitative of the present invention, and wherein.

DESCRIPTION OF THE PREFERRED EMBODIMENT

One of the preferred embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

The present invention provides a radio frequency identification (RFID) device including a detector and several identification tags. The detector transmits a time slot cycle signal, and each of the cycle signals is divided into several slots. The identification tags receive the time slot cycle signal, and each of the tags respectively contains a random generator to generate a random number. Individual identification tag responds to the detector in an assigned time slot corresponding to a random number generated by the random generator in each single time slot cycle.

The present invention further discloses a method to be used in the RFID device for identifying the tags with the same identification code, including: transmitting a continuous time slot cycle signal, wherein each of the time slot cycles is divided into several slots; detecting all responses from the tags in the detection range, wherein the responses are in different time slots; and counting all responses from the tags and comparing them with the threshold to confirm the existence of the tags.

Figure 1:
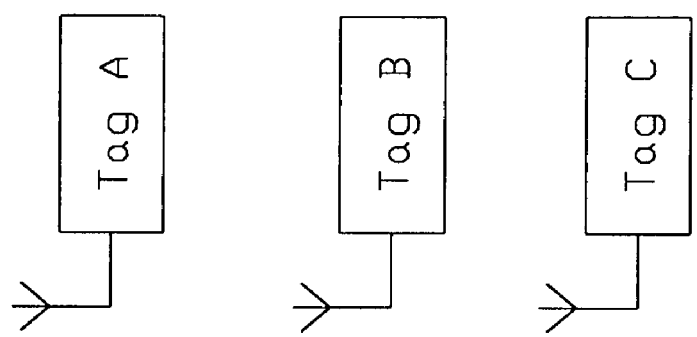
FIG. 1 shows the presently inventive radio frequency identification system.
Figure 1:
Figure 1:
Figure 1:
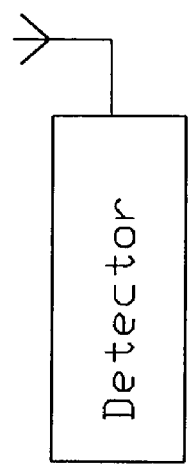

FIG. 1 illustrates the preferred embodiment of the RFID system of the present invention. Electromagnetic wave signals at about frequency 13.56 MHz are generated by a detector. A detection range or volume is formed within the transmission region of the electromagnetic radio signals. While passage of a tag through the detection range, the tag receives the electromagnetic radio signals to generate resonance and sends a response signal in response to the detector. The response signal includes the identification code of the tag. The detector identifies different tags according to the different identification codes while the detector receives the responses from tags.

Besides, the tag generates a random number and responds a response signal in the corresponding time slot according to the random number. By doing so, the detector can identify the tags with the same identification code according to the response signals of the tags in different time slots although there are many tags with the same identification code in the detection range at the same time.

Figure 2:
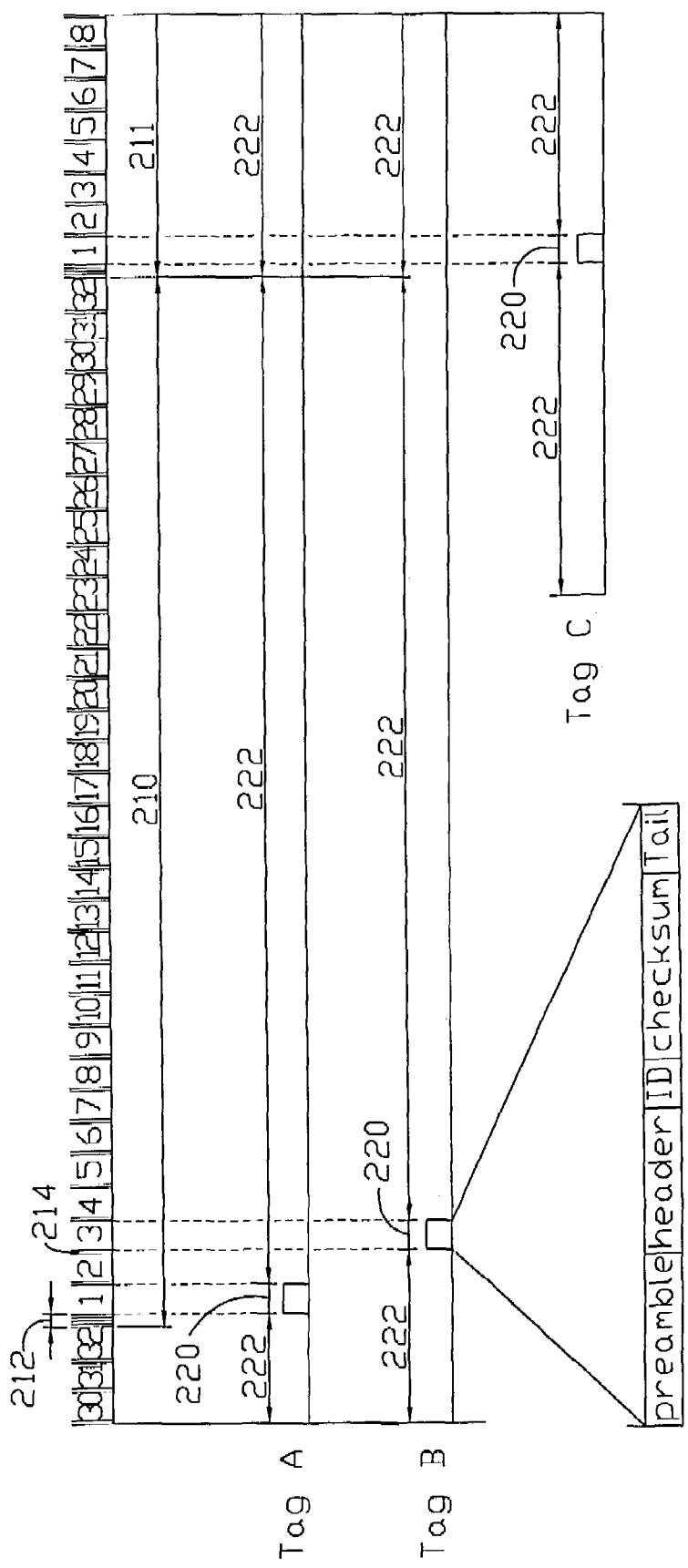
FIG. 2 shows the communication timing between the detector and the tags in FIG. 1.

FIG. 2 illustrates communication timings between the detector and the Tags, A, B and C, in FIG. 1. A time slot cycle 210 is a 13.56 MHz of electromagnetic wave or a so-called scan signal generated by the detector. The time slot cycle 210 is divided into 32 time slots, and uses a mute signal 214 as an interval between these time slots. As to the interval between the time slot cycle 210 and 220, four continuous mute signals are used as the time slot cycle interval 212. The mute signal 214 is a result of temporary interruption of the electromagnetic radio signals from the detector.

The tag in resonance through rectification provides a work power for the tag. However, the work power for the tag in other embodiments can use an exterior power such as batteries.

One characteristic of the present invention is that the tag contains a random generator. In accordance with the embodiment, the random generator is a resonance circuit, and continuously generates a random number by applying the uncertainty of an oscillator. Wherein the range of the random number cannot exceed the number of time slots in a time slot cycle, and the tag starts to count for confirming the time slot after receiving the time slot cycle interval 212.

As shown in FIG. 2, the Tag A generates a random number "1", thus the Tag A responds to the detector in the first time slot after the time slot cycle interval 212. Similarly, the Tag B generates a random number "3", thus the Tag B responds to the detector in the third time slot after the time slot cycle interval 212. The activation time 220 is a period that the tag activates during and about equal to a time slot. The rest of the exclusive activation time 220 is sleeping time 222. The tag stops any activities except counting in the sleeping time 222 until the corresponding time slot appearing.

The Tag C joins the detection range in the middle of the time slot cycle 210, thus the Tag C cannot count and respond to the detector until next time slot cycle 211.

As mentioned above, the tag is allowed to activate only in the activation time 220, hence the tag simultaneously generates a new random number to assign the time slot in next time slot cycle while the tag responds to the detector. Therefore, the tag generates different random number in each time slot cycle while the tag still stays in the detection range. This is, the tag responds to the detector in different time slot in each time slot cycle.

However, the range of the random number is restricted within the number of time slots. For example, the time slot cycle 210 is divided into 32 time slots in the embodiment hence the range of the random number should be between 1 and 32. While there are many tags in the detection range, the tags with the same random number may occur. This situation causes many tags responding to the detector in the same time slot and leads to a collision. Therefore, in other embodiments, the number of the divided time slot can depend on the practical needs, and the collision can be reduced by dividing the time slot cycle into more time slots.

Moreover, while the collision occurs, the responses from many tags result in chaotic responses, and the detector cannot classify the response from tags.

As shown in FIG. 2, the message of the tag responding to the detector includes a preamble, a header, an ID, a checksum, and a tail. Wherein, the random number generated by the random generator is included in the ID field. However, the message format is not just limited in the format mentioned above, but can be adjusted to adapt to different applications.

Figure 3:
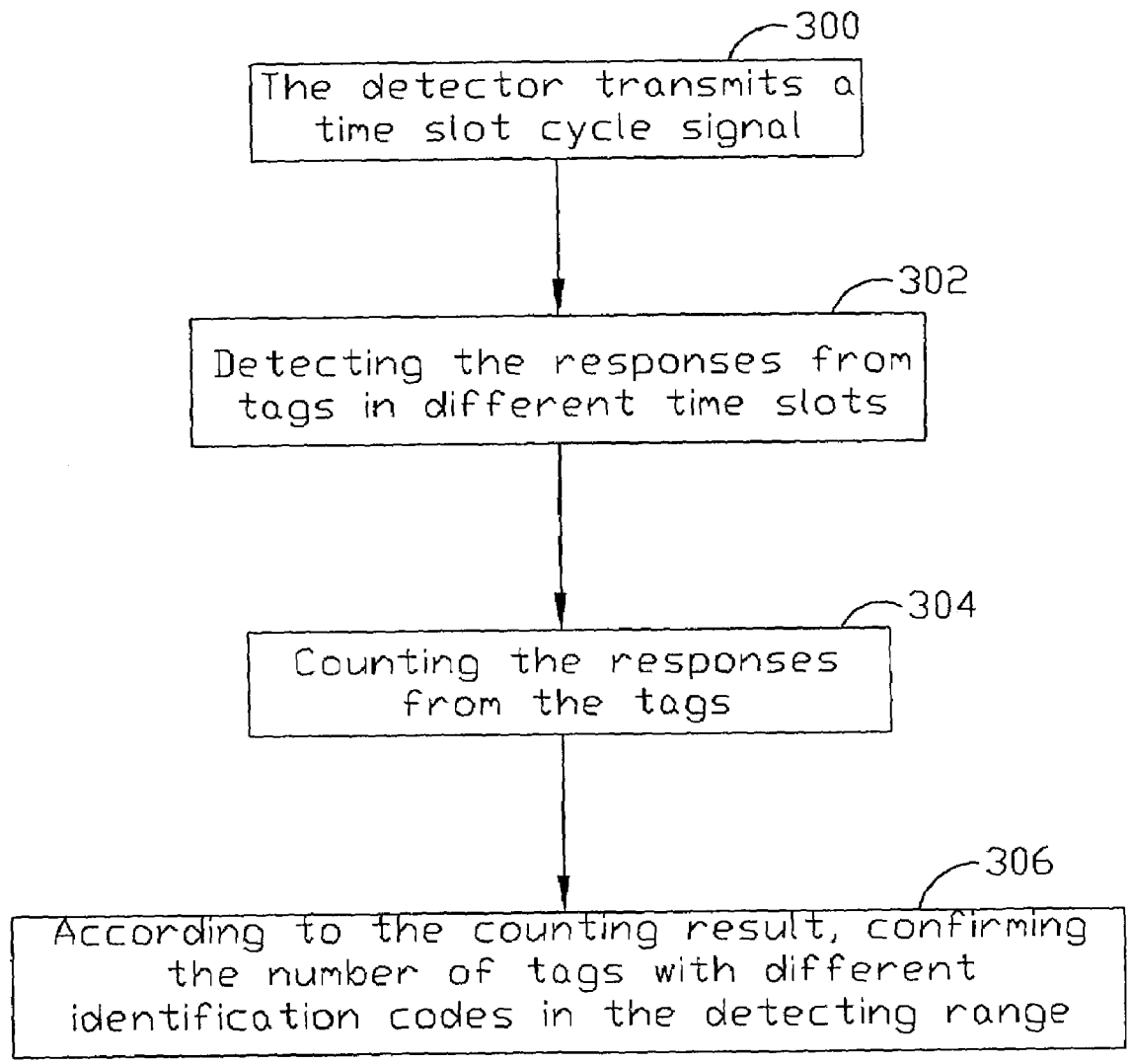
FIG. 3 shows the flow charts of the detector detecting the tags.

FIG. 3 illustrates the flow charts of the detector detecting the tags in the detection range. The detector transmits a time slot cycle signal 300, and the time slot cycle has 32 time slots in the embodiment. The tag in the detection range generates a random number to assign a corresponding time slot to respond to the detector. Hence, the detector receives the individual tag response message 302 in a different time slot in the time slot cycle. Normally, a collision cannot occur since the random numbers of the tags are different. The detector identifies the tags with the same identification code according to the response message in the different time slots.

Besides, for solving the unidentified problem resulted from the collision, the detector counts the number of times 304 of the tag response message. For example, as shown in FIG. 2, the Tag A and Tag B respectively has identification code "001" and "002", and the Tag C also has the same identification code "002". While the response messages of Tag A, Tag B, and Tag C are in the different time slots in the time slot cycle, the detector detects the number of tags and records the number of times. For example, one tag has the identification code "001" and two tags have the identification code "002". If there is no collision in the next time slot cycle, the detector will detect the Tag A, Tag B, and Tag C again and respectively add one to their number of times. The detector will confirm the existence of the tag while the numbers of times of the tag exceed a predetermined threshold. For example, the predetermined threshold in the embodiment is five. This is, while the Tag A, Tag B, and Tag C have no collisions during five continuous time slot cycles, the detector will just confirm the existence of Tag A, Tag B, and Tag C in the detection range. Furthermore, the maximum limit in the embodiment is ten, and the number of times will not be accumulated while it exceeds ten.

The detector will decrease the number of times by degrees while the collision or noise results in the unidentified situation. Similarly, while the number of times of the tag is lower than the predetermined threshold, the detector will not confirm the existence of the tag in the detection range. Besides, the frequency of the continuous time slot cycle is very high, and hence the detector can confirm the number of tags in the detection range during a short time.

However, using the single threshold in the embodiment for confirming the existence of the tag is not the only applied method. Other counting methods can also be applied to confirm the existence of the tag. Furthermore, the threshold designed can depend on both response time and reliability of the detector.

As shown in FIG. 3, after the step 304 and according to the number of times of the tags counted, the detector confirms the number of tags 306 with different identification codes in the detection range. By doing so, the tags with different identification codes and the numbers changed in the detection range can be simultaneously detected.

Although specific embodiments have been illustrated and described, it will be obvious to those skilled in the art that various modifications may be made without departing from what is intended to be limited solely by the appended claims.

What is claimed is:

1. A radio frequency identification (RFID) device, comprising:
   a detector transmitting a time slot cycle signal, wherein each cycle of said time slot cycle signal is divided into a plurality of time slots;
   a plurality of tags receiving said time slot cycle signal, each one of said plurality of tags responds to said detector in a random time slot; and
   means in the detector for counting the responses from each one of said plurality of tags respectively with a plurality of cycles of said time slot cycle signal, wherein one of said plurality of tags is identified while the number of consecutive responses of said plurality of tags exceeds a predetermined threshold.

2. The RFID device according to claim 1, wherein each of said plurality of tags respectively contains a random generator to generate a random number, and responds to said detector in an assigned time slot corresponding to said random number in each said time slot cycle signal, wherein the range of any said random number cannot exceed the number of said plurality of time slots.

3. The RFID device according to claim 2, wherein said random generator is a resonance circuit.

4. The RFID device according to claim 2, wherein said random generator generates a new random number for each new cycle of said time slot cycle signal.

5. The RFID device according to claim 1, wherein said time slot cycle signal is a 13.56 MHz of electromagnetic wave.

6. The RFID device according to claim 1, wherein a mute signal is used as an interval between each of said time slots, and four continuous mute signals are used as an interval between each said cycle of said time slot cycle signal.

7. A method for a detector of a radio frequency identification (RFID) device being able to identify a plurality of tags with same identification codes comprising:
   transmitting a continuous time slot cycle signal, wherein each cycle of said time slot cycle signal is divided into a plurality of time slots;
   detecting all responses from said plurality of tags in the detection range; and
   counting the responses from each of said plurality of tags respectively with a plurality of cycles of said time slot cycle signal, wherein one of said plurality of tags is identified while the number of consecutive responses of said plurality of tags exceeds a predetermined threshold.

8. The method according to claim 7, wherein each one of said plurality of tags further comprises a random generator generating a random number to decide the corresponding responsive time slot.

9. The method according to claim 7, wherein each one of said plurality of tags responds to said detector in a random time slot for each cycle of said time slot cycle signal.

10. The method according to claim 7, wherein said time slot cycle signal is a 13.56 MHz of electromagnetic wave.

11. The method according to claim 7, wherein a mute signal is used as an interval between each of said time slots, and four continuous mute signals are used as an interval between each cycle of said time slot cycle signal.

* * * * *